2,899,271

PROCESS FOR THE MANUFACTURE OF PHOSPHATIC FERTILIZERS

Robert Miché, Chatou, France, assignor to Comptoir des Phosphates de l'Afrique du Nord, Paris, France, a corporation of the French laws No Drawing. Application February 8, 1955
Serial No. 486,981

Claims priority, application France February 11, 1954

3 Claims. (Cl. 23—109)

Many processes are known which deal with the manufacture of phosphatic fertilizers containing phosphoric acid in available form from natural mineral phosphates, sulphurous acid in a saturated or non-saturated solution, at atmospheric pressure or at higher pressure, at high or low temperature and in presence of other chemicals such as sulphuric acid, alkali metal sulphates, etc.

The action of gaseous sulphur dioxide upon natural phosphates has also been proposed at elevated temperature in the presence of or without steam, air, or other chemicals.

None of the proposed processes (of which several contradict chemical theories) has been applied for industrial purposes.

This may be explained by the fact that the above mentioned processes used up-to-now (except those utilising a complementary acid or acid salt) lead to the manufacture of a $P_2O_5$ low grade fertilizer containing always an important amount of calcium sulphite, or form a double salt of "sulphitophosphate." Thus one has never succeeded to obtain a technical pure salt of monocalcium phosphate or dicalcium phosphate by the known means using sulphur dioxide alone.

Only the manufacture of such products is still interesting, but it is obvious that the latter supposes, at any stage of the process, the separation of the calcium contained in natural phosphates in excess to the quantity of calcium contained in dicalcium phosphate, for the same amount of $P_2O_5$.

Some inventors have succeeded in obtaining this result in laboratory by using, as it has been mentioned above, a complementary strong acid or salt; but it is obvious that the cost of such a process is higher, especially if the operations include treatment complications leading to prohibitive expenses which are not in proportion with the economy resulting from the utilization of one acid equivalent, which is the indispensable minimum, instead of two equivalents as in the classical processes.

The first stage of the process according to my invention is known: the natural phosphate is attacked by agitation in the presence of a saturated $SO_2$ solution, by preference at a low temperature and under pressure.

I thus obtain a leaching liquor containing in dissolution the whole of $P_2O_5$ of the natural phosphate, if the operating conditions are well chosen. In this leaching liquor I find also CaO of the natural phosphate with a ratio $P_2O_5/CaO$ about the same as in the mentioned phosphate.

Starting from this leaching liquor by eliminating $SO_2$, at a moderate temperature (for example 70° C.) and under reduced pressure, it is possible to obtain a precipitate containing $P_2O_5$ as a citrate ammonium soluble salt; however the latter will comprise a mixture of dicalcium phosphate and calcium sulphite, or a solid solution or a "sulphitophosphate" in which the ratio $P_2O_5/CaO$ is always about the same as the one in the mother solution.

Some inventors have however noticed that the ratio $P_2O_5/CaO$ of the precipitate changes during the operation of precipitation and have thought that it could be possible to obtain by fractional precipitation products containing more $P_2O_5$. There is no interest in such processes if we consider that the precipitation, by elimination of sulphur dioxide from the leaching liquor of the natural phosphates by a solution of sulphurous acid, can only give, in any case, products containing an important proportion of sulphite, even through fractional precipitation. It must be noted that the yield of such an operation is so much lower when the obtained fractions are rich in dicalcium phosphate.

On the contrary my invention permits to obtain quantitatively from the natural phosphates the $P_2O_5$ as dicalcium phosphate at an average purity of 90%.

My invention is based on the study of the system $P_2O_5$—CaO—$SO_2$—$H_2O$.

My process comprises preparing a saturated solution in $P_2O_5$, $SO_2$, CaO, whether directly from the leaching liquor of a natural phosphate according to the above mentioned conditions, or indirectly from the precipitate obtained by elimination of $SO_2$ in such a leaching liquor.

Such a solution simultaneously saturated in $P_2O_5$, CaO and $SO_2$ may be obtained only in the presence of an excess of a stable solid phase, in equilibrium with the solution and formed, not by the natural phosphate, but by dicalcium phosphate and calcium sulphite or by the precipitate mentioned above.

When the $SO_2$ content of the solution reaches the point of saturation under pressure, the solid phase in equilibrium is formed by a pure dicalcium phosphate.

The elimination of $SO_2$ from the corresponding liquid phase produces the precipitation of the quasi pure dicalcium phosphate.

Practically, my invention comprises adding an amount of dicalcium phosphate, which may be derived from a preceding manufacture, to the leaching liquor obtained in the above mentioned way, in such a manner as to have a slight excess of it in proportion to the amount which is necessary to produce the saturation in $P_2O_5$ corresponding to the amount of the $SO_2$ of the leaching liquor.

The resulting shifting of equilibrium causes the precipitation of the calcium sulphite, thus eliminating the excess of calcium in proportion to the dicalcium phosphate. It is then sufficient to filter or to decant the sulphite and to eliminate $SO_2$ from the saturated solution, preferably by heating under pressure, in order to obtain the precipitation of the whole $P_2O_5$ contained in the solution as pure dicalcium phosphate.

As it has been mentioned in the description of preceding processes, $SO_2$ and residual liquor of precipitation can be recovered for entering into a new cycle of manufacture.

According to my invention, it is also possible to prepare the solution simultaneously saturated in $P_2O_5$, CaO and $SO_2$ starting from the precipitate obtained by elimination of $SO_2$ from the leaching liquor of natural phosphates. In that case it is sufficient to again dissolve the above mentioned precipitate in a solution of $SO_2$ under pressure and to regulate the volumes of the solution and the quantities of the precipitate in such a way as to obtain an excess of $P_2O_5$ in the solid in proportion to the amount necessary to saturate in equilibrium the solution of $SO_2$.

Under these conditions the calcium sulphite contained in this precipitate remains insoluble and it suffices, as before, to filtrate or to decant and then to eliminate the $SO_2$ from the saturated solution to obtain the pure dicalcium phosphate.

Example 1

A Morocco phosphate containing about 34% $P_2O_5$ is treated in an air-tight apparatus by a saturated solution of $SO_2$ in the presence of a slight excess of liquid $SO_2$, in the proportion of 100 g. of phosphate for 1 liter of solution. The reaction takes place through strong agitation during 1 hour at room temperature (20–25°) and under the pressure of saturated vapour of $SO_2$ at this temperature (about 2.5 kg./cm.$^2$).

The leaching liquor, separated from insoluble slurries by filtration or decantation, is agitated, under the same conditions as mentioned above, with a suitable amount of dicalcium phosphate, which may be obtained from a preceding operation. This amount is chosen in such a way to obtain a solution simultaneously saturated in $P_2O_5$, CaO and $SO_2$ in equilibrium with a solid insoluble phase formed by 60–70% of calcium sulphite and dicalcium phosphate (the solid may be retreated in order to recover the phosphate).

The solution simultaneously saturated in $P_2O_5$, CaO and $SO_2$ is expanded (brought back to atmospheric pressure), then heated to about 70° C. under reduced pressure in order to eliminate $SO_2$ (which is recovered by liquefaction or absorption) to a residual amount of about 15 g./l. of $SO_2$. Thus, about 200 g. of precipitate by 1 liter of solution are obtained, containing principally the dicalcium phosphate at about 40% $P_2O_5$; the remaining (about 5%) is formed by calcium sulphate and calcium sulphite, which may be completely oxidized to sulphate.

Example 2

The first stage is the same as in the Example 1.

The obtained leaching liquor, separated from insoluble slurries, is expanded, then precipitated by elimination of $SO_2$ (that is recovered) as described above. The obtained precipitate, comprising calcium sulphite (about 30–40%) and dicalcium phosphate, or a solid solution, is treated by a saturated sulphur dioxide solution, under the pressure of saturated vapor of $SO_2$, at room temperature and in the proportion of 250–300 g. of precipitate by liter of solution, in order to saturate the solution in $P_2O_5$ and CaO in the presence of a sufficient excess of solid. The fraction comprises calcium sulphite with about 30% of dicalcium phosphate, which can be separated from the saturated solution (this insoluble fraction may be retreated).

A mixture containing dicalcium phosphate at 40% $P_2O_5$ is precipitated by eliminating $SO_2$ from the obtained saturated solution, as described above.

What I claim is:

1. In a process for the manufacture of dicalcium phosphate from natural phosphate in which the natural phosphate is treated with a cold aqueous solution of $SO_2$ under pressure, followed by separation of the resulting phosphate solution from insoluble material, the improvement which comprises adding dicalcium phosphate to the phosphate solution in an amount sufficient to raise the $P_2O_5$/CaO ratio in the phosphate solution to a value equal to that of dicalcium phosphate, about 1.27, by the precipitation of calcium sulphite from the solution, separating the precipitated calcium sulphite from the solution, heating the solution to liberate $SO_2$ and thereby to precipitate dicalcium phosphate and recovering the precipitated dicalcium phosphate.

2. The process claimed in claim 1 wherein the dicalcium phosphate mixed with the phosphate solution is obtained from the process itself.

3. In a process for the manufacture of dicalcium phosphate from natural phosphate in which the natural phosphate is treated with a cold aqueous saturated solution of $SO_2$ under pressure, followed by separation of the resulting phosphate solution from insoluble material, and by heating the resulting phosphate solution to remove $SO_2$ and give a crude precipitate containing dicalcium phosphate and calcium sulphite, the improvement which comprises treating the crude precipitate with a saturated aqueous solution of $SO_2$, in a proportion such that a portion of the dicalcium phosphate in the crude precipitate remains undissolved, to give, by the precipitation of calcium sulphite, a solution in which the ratio $P_2O_5$/CaO is about equal to that of dicalcium phosphate, about 1.27; separating the solution from the undissolved precipitate and heating the solution to liberate $SO_2$ and precipitate dicalcium phosphate.

References Cited in the file of this patent

UNITED STATES PATENTS

| | | |
|---|---|---|
| 852,371 | Bergmann | Apr. 30, 1907 |
| 1,326,533 | Sadtler | Dec. 30, 1919 |
| 2,136,793 | Gabeler et al. | Nov. 15, 1938 |

FOREIGN PATENTS

| | | |
|---|---|---|
| 4,036 | Great Britain | Aug. 21, 1883 |
| 7,234 | Great Britain | July 31, 1913 |